United States Patent
Hascher et al.

(10) Patent No.: US 10,655,341 B2
(45) Date of Patent: May 19, 2020

(54) FLOORING MAT WITH ENTANGLED FILAMENT STRUCTURE

(71) Applicants: LOW & BONAR INC., Candler, NC (US); MP GLOBAL PRODUCTS, Norfolk, NE (US)

(72) Inventors: Lori Hascher, Candler, NC (US); James Mathis, Candler, NC (US); Jignesh Patel, Candler, NC (US); Alan Collison, Norfolk, NE (US)

(73) Assignees: LOW & BONAR INC., Candler, NC (US); MP GLOBAL PRODUCTS, Norfolk, NE (US)

( * ) Notice: Subject to any disclaimer, the term of this patent is extended or adjusted under 35 U.S.C. 154(b) by 0 days.

(21) Appl. No.: 16/008,734

(22) Filed: Jun. 14, 2018

(65) Prior Publication Data

US 2019/0383032 A1    Dec. 19, 2019

(51) Int. Cl.

| | |
|---|---|
| *E04F 15/18* | (2006.01) |
| *B32B 3/26* | (2006.01) |
| *B32B 5/02* | (2006.01) |
| *B32B 5/26* | (2006.01) |
| *B32B 7/12* | (2006.01) |
| *B32B 13/12* | (2006.01) |
| *B32B 21/08* | (2006.01) |
| *B32B 27/12* | (2006.01) |
| *B32B 27/32* | (2006.01) |

(Continued)

(52) U.S. Cl.
CPC ............... *E04F 15/18* (2013.01); *B32B 3/26* (2013.01); *B32B 5/022* (2013.01); *B32B 5/26* (2013.01); *B32B 7/12* (2013.01); *B32B 13/12* (2013.01); *B32B 21/08* (2013.01); *B32B 27/12* (2013.01); *B32B 27/32* (2013.01); *E04F 15/206* (2013.01); *B32B 2262/0253* (2013.01); *B32B 2307/7246* (2013.01); *B32B 2471/04* (2013.01); *E04B 1/64* (2013.01)

(58) Field of Classification Search
CPC ........ E04F 15/18; E04F 15/206; B32B 27/32; B32B 5/022; B32B 21/08; B32B 13/12; B32B 7/12; B32B 5/26; B32B 27/12; B32B 3/26; B32B 2307/7246; B32B 2262/0253; B32B 2471/04

See application file for complete search history.

(56) References Cited

U.S. PATENT DOCUMENTS 4,212,692 A * 7/1980 Rasen ................... D04H 3/16
156/167
5,960,595 A * 10/1999 McCorsley, III ........ B32B 3/30
52/199

(Continued)

FOREIGN PATENT DOCUMENTS

WO    2016/061346 A1    4/2016

OTHER PUBLICATIONS

Feb. 15, 2019 Extended European Search Report issued in European Patent Application No. 18178009.9.

*Primary Examiner* — Adriana Figueroa
(74) *Attorney, Agent, or Firm* — Oliff PLC

(57) ABSTRACT

A flooring mat that includes a first layer that includes a vapor barrier, a second layer that includes a textile pad, and a third layer having an entangled filament structure. The second layer is disposed between the first layer and the third layer. The flooring mat may be provided between a subfloor and a surface layer of a flooring structure.

20 Claims, 1 Drawing Sheet

(51) Int. Cl.
  *E04F 15/20* (2006.01)
  *E04B 1/64* (2006.01)

(56) References Cited

U.S. PATENT DOCUMENTS

| | | | | |
|---|---|---|---|---|
| 5,972,477 | A * | 10/1999 | Kim | B32B 3/28 |
| | | | | 428/175 |
| 6,804,922 | B1 * | 10/2004 | Egan | B32B 5/02 |
| | | | | 52/309.1 |
| 8,096,900 | B2 * | 1/2012 | Haseth | A63B 63/00 |
| | | | | 463/31 |
| 8,528,286 | B2 * | 9/2013 | Keene | B32B 5/12 |
| | | | | 52/145 |
| 8,647,734 | B2 * | 2/2014 | Keene | B32B 3/06 |
| | | | | 428/193 |
| 8,763,330 | B2 * | 7/2014 | Pollack | D04H 1/4266 |
| | | | | 52/169.4 |
| 9,151,043 | B1 * | 10/2015 | Fritz | E04B 2/28 |
| 9,254,624 | B2 * | 2/2016 | Calkins | B32B 5/245 |
| 9,499,986 | B2 * | 11/2016 | Kalkanoglu | E04D 1/30 |
| 9,783,980 | B2 * | 10/2017 | Snyder | E04B 1/625 |
| 10,316,527 | B2 * | 6/2019 | Keene | E04F 15/0215 |
| 2003/0134557 | A1 * | 7/2003 | Collison | B32B 5/08 |
| | | | | 442/356 |
| 2003/0199217 | A1 * | 10/2003 | Cashin | B32B 27/12 |
| | | | | 442/394 |
| 2005/0281980 | A1 * | 12/2005 | Cruz | B29C 70/44 |
| | | | | 428/131 |
| 2006/0156663 | A1 * | 7/2006 | Mao | B32B 3/30 |
| | | | | 52/403.1 |
| 2007/0110950 | A1 * | 5/2007 | Yang | A47L 23/266 |
| | | | | 428/95 |
| 2010/0282539 | A1 * | 11/2010 | Cais | B32B 5/26 |
| | | | | 181/290 |
| 2011/0107700 | A1 | 5/2011 | Keene | |
| 2014/0202626 | A1 * | 7/2014 | Sennik | E04F 15/0215 |
| | | | | 156/249 |
| 2018/0080234 | A1 | 3/2018 | Giles et al. | |

\* cited by examiner

FLOORING MAT WITH ENTANGLED FILAMENT STRUCTURE

BACKGROUND

Flooring mats can be used within a floor structure. These flooring mats, which may include textile pads, may be desirable, for example, when a wood or other type of flooring is applied over a sub flooring. Some flooring mats can also be used under a laminate floor underlayment as well as under a ceramic tile floor.

U.S. Pat. No. 8,341,910, incorporated by reference herein, provides for examples of an insulating floor underlayment that can be particularly usable for a laminate floor underlayment and ceramic tile floor.

Improved acoustic and insulation properties, as well as the ability for improved ventilation throughout the flooring mat and entire floor underlayment, are desirable. Further, the utility of a flooring mat that can be utilized under gyperete (a gypsum concrete) or concrete can be improved.

SUMMARY

A flooring mat is provided in some embodiments. The flooring mat includes a first layer, a second layer that includes a textile pad, and a third layer having an entangled filament structure.

In some embodiments, a floor structure is provided. The floor structure includes a subfloor, a flooring surface, and a flooring mat disposed between the sub floor and the flooring surface. The flooring mat includes a first layer, a second layer that includes a textile pad, and a third layer having an entangled filament structure.

DETAILED DESCRIPTION OF EMBODIMENTS

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the device and method described herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, the subject matter of this application illustratively disclosed herein suitably may be practiced in the absence of any element(s) that are not specifically disclosed herein.

The following definitions are provided in order to aid those skilled in the art in understanding the detailed description.

As used herein, the term "flooring mat" refers to any component or combination of components that can be provided atop, under, or within a flooring structure. The term flooring mat is intended to include, though not exclusively be limited to, a structure that includes insulating materials.

As used herein, a vapor barrier refers to any structure that prohibits, or at least impedes, vapor, such as water vapor, from crossing from one side of the barrier to another.

As used herein, an entangled filament structure relates to a polymer structure that is formed by extrusion into a three-dimensional structure having a patterned configuration.

Figure 1:
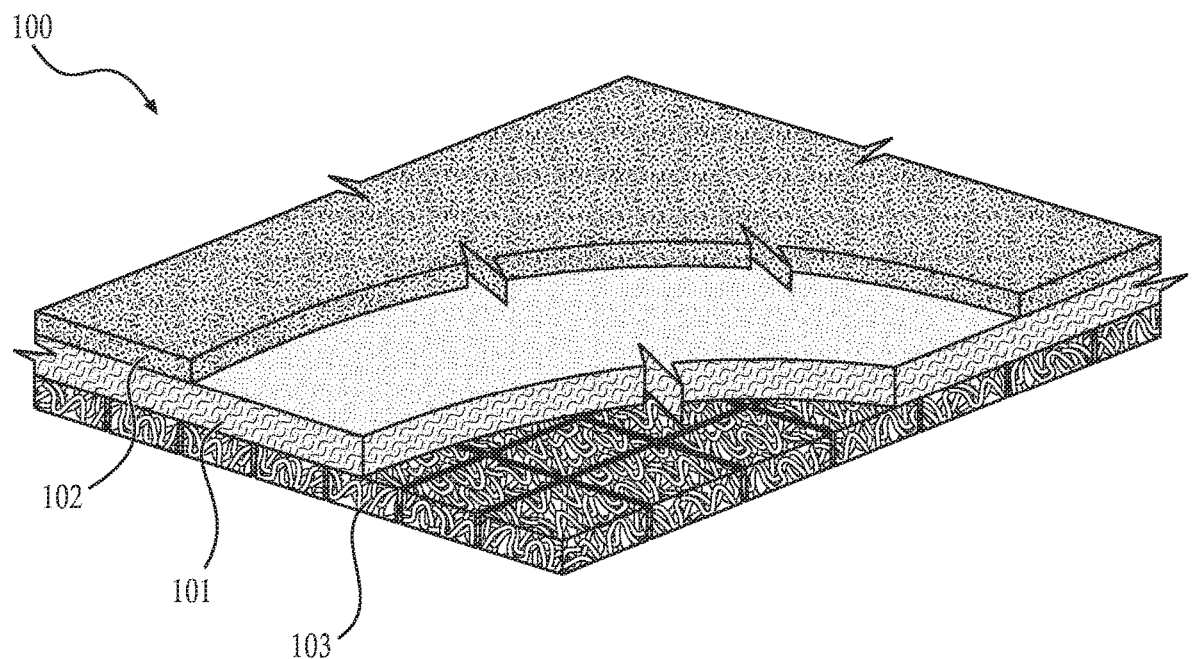
FIG. 1 shows a cross-sectional view of a portion of an example flooring mat.

FIG. 1 illustrates an example flooring mat 100 of this application. In FIG. 1, a flooring mat 100 includes an insulative pad, or textile pad, 101. The textile pad may be comprised of a textile batt, which can refer to a sheet of matted fibers. A process of machining insulating materials, to form the textile batt, as well as machining the textile batt to form the textile pad 101 are described in U.S. Pat. No. 8,341,910, incorporated by reference herein.

The textile pad 101 may be formed of any suitable materials, including compositions such as polyester, nylon, acrylic, cotton, polypropylene, denim, foam or combinations thereof, including both natural and man-made fibers. A density of the textile pad 101 may be from at least 10 pounds per cubic foot, or from about 10 to about 20 pounds per cubic foot.

The fibers that comprise the textile pad 101 may be randomly distributed textile and binder fibers. The fibers may have lengths of from 1/64 to 3 inches, or from 1/16 to 1.5 inches, or from 1/4 to 1/2 inches. The fibers may have a linear mass density of between 5 to 12 deniers.

While only one textile pad 101 is shown, the flooring mat 100 may utilize multiple textile pads 101. In some embodiments, two textile pads may be utilized in the floor structure. Further, the number of textile pads may be more than two as appropriate. In embodiments where two textile pads 101 are used, the textile pads may be of the same thickness, or of varying thicknesses, and of the same density, or of varying densities.

In embodiments where binder fibers are included in the textile pad 101, the binder fibers may be thermoplastic binding fibers and may be laid randomly yet consistently in x-y-z axes. There also may be included reinforcement fibers, which can be laid in the same manner, and/or which can be bound together by heating the binder fibers above their glass transition temperature. The reinforcement fibers may also be interlocked and distributed substantially randomly in a first plane.

In some embodiments, less than about 20% by weight binder fiber is used, or less than about 15% binder fiber is used to form the textile pad 101.

The thermoplastic binder fibers may have a weight of less than 0.2 pounds per square foot or about 0.1875 pounds per square foot. The remaining reinforcement fiber may be greater than 0.8 pounds per square foot, or may be about 1.0625 pounds per square foot. The binder fibers may be a mixture of thermoplastic polymers which comprise or consist of polyethylene/polyester or polypropylene/polyester or combinations thereof.

The textile pad 101 may comprise a fibrous web layer where one surface of the fibrous web layer is coated with an adhesive.

The flooring mat 100 may also include a vapor barrier 102. The vapor barrier 102 may comprise a single polyethylene layer. The vapor barrier may be a plastic 102 sheet material, and may range from about 0.5 to 1.0 mil (thousandths of an inch), or about 0.75 mil, in thickness. The vapor barrier 102 may prevent the travel of water vapor from the flooring surface through to the textile pads 102. The vapor barrier 102 may include some materials contributing to sound abatement properties.

The vapor barrier 102 may be a copolymer or coextruded polyethylene, but any flexible vapor barrier of a suitable thickness may be used.

The vapor barrier 102 may be manufactured by processes described in U.S. Pat. No. 8,341,910. In some embodiments, the vapor barrier 102 may be fixedly coupled to the textile pad 101 on one surface of the textile pad 101, either by means of the adhesive provided on the textile pad 101, or by any other technique.

On an opposite side surface of the textile pad 101 from the vapor barrier 102, an entangled filament structure 103 may be provided.

The entangled filament structure 103 may be comprised of an entangled core having a three-dimensional patterned structure. The entangled core may be made of any thermoplastic material. In some embodiments, the thermoplastic material of the entangled core is able to withstand temperatures of over 65 to about 100° C. The thermoplastic material may be, for example, a polyester, polyolefin, or nylon. Exemplary materials for the entangled core include polypropylene, nylon 6 (or polyamide 6), polylactic acid, polycaprolactone, polyethylene terephthalate, polybutylene terephthalate, polytrimethylene terephthalate, polyethylene naphthalate, vectran, high density polyethylene, and blends or copolymers thereof.

The polymer structure of the entangled filament structure 103 formed of the entangled core is formed by extrusion into a three-dimensional structure having a patterned configuration. For example, the entangled filament structure may have a patterned configuration including pyramids, cones, cylinders, cubes and the like. For example, the entangled filament structure 103 has a structure comprised of patterned cubes each spaced from each other along a first axis and a second axis perpendicular to the first axis. In other words, the entangled filament structure may be configured in a gridlike or indented lattice shape pattern and comprise individual cubes (having a substantially square three-dimensional structure), or domes (having a substantially rounded-top when viewed in three dimensions), separated by intersecting lanes. The individual cubes or domes may be evenly spaced from each other. The lanes may be such where the polymers of the entangled filament structure 103 are adhered to the underlying surface, which may be a surface of the textile pad 101 or of any other surface of the flooring mat 100, or any surface of the subfloor or other surface of the floor structure. The structure with the spacings in between each of the components of the pattern may have an advantage of having dedicated "nodes" of entangled filament material so that the pad can be easily lifted from a building material, even when the building material is wet. In some embodiments, the shape of the entangled filament structure may allow for an even bonding to the textile pad 101.

In each of the individual cubes or domes, there may exist an indentation in the center, or substantially near the center, of each structure. The indentation may protrude at least part way, or even fully through the thickness of the entangled filament structure 103.

The patterned configuration of the entangled filament structure 103 may create one or more open air gaps. Such air gaps or air spaces may make up about 50% to about 99% of the entangled filament structure, or about 80 to about 99% of the entangled filament structure, or, about 85 to about 99%, about 90 to about 99%, or about 95 to about 98%. These air gaps can provide a spacing between at least some portions of the entangled filament structure 103 and the textile pad 101.

The entangled filament structure 103 may have a thickness, measured by the method described in ASTM D-6525, may be in a range of from, for example, about 0.03 inches to about 5.0 inches in thickness, or about 0.03 to about 0.4 inches, about 0.1 to 0.3 inches, or about 0.12 or about 0.2 inches. The entangled filament structure may have a basis weight in a range of from, for example, about 5 to about 25 ounces per square yard (oz/yd$^2$), about 10 to about 20 oz/yd$^2$, or about 12 to about 18 oz/yd$^2$. The entangled filament structure may have a thickness of about 1.5 inches with a basis weight of about 15 oz/yd$^2$.

In addition to allowing for improved insulating properties for the building/structure, the entangled filament structure 103 may advantageously reduce thermal heat flux through the structure/building. The flooring mat 100 may have a sufficient thickness and flexibility to be able to be rolled during transport, installation, and/or storage. The flooring mat may also have a structure allowing for it to be readily cut and shaped to required dimensions.

The entangled filament structure 103 may be machined to or otherwise adhered to the textile pad 101 by thermal bonding, or any other desirable adhesion process.

In some embodiments, the entangled filament structure may include thermally bonded polypropylene, or polyamide 6, and may have monofilaments ranging from about 300 to 1000 micrometers in diameter, or 650 to 750 micrometers in diameter. In other embodiments, the filaments are not monofilaments but are instead multifilaments.

In some embodiments, the flooring mat 100 may have a thickness from about 0.1 inches to about 2 inches, or 0.2 inches to about 1 inch.

In some embodiments, the flooring mat 100 is comprised of three layers, the first layer corresponding to the vapor barrier 102, the second layer corresponding to the textile pad (insulative pad) 101 and the third layer having the entangled filament structure 103. Each layer may include only these respective identified components, or may include other combinations of the respective identified components and other components advantageous during the machining process. Additional layers may be provided as needed.

Figure 2:
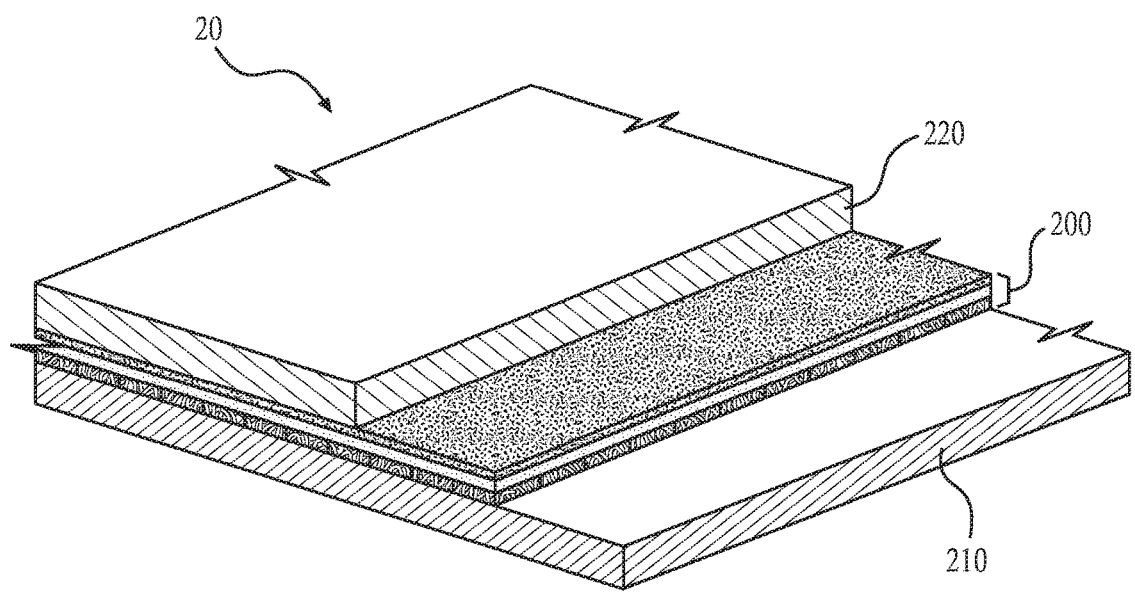
FIG. 2 shows a floor structure having the flooring mat disposed therein.

Referring to FIG. 2, a floor structure 20 is provided. The floor structure 20 may include a subfloor 210 and surface layer 220. The surface layer 220 may be a laminate flooring or a gyperete or a concrete. The floor structure 20 may include a flooring mat 200 having substantially the same features as the flooring mat 100 described in FIG. 1. Thus, features of the flooring mat 200 are not repeated herein.

The subfloor 210 may be provided as the base for a floor covering. It is applied over the main floor structure. Between the subfloor 210 and the a surface layer 220 may be provided the flooring mat 200.

In some embodiments, the surface layer 220 includes a wood base laminate. In some embodiments, the surface layer 220 may also include gyperete. The surface layer 220 may additionally or alternatively include laminate, carpeting, tile, wood, or any suitable floor covering material. The surface layer 220 and flooring mat 200 may together provide for an insulating material to provide beneficial sound absorbing characteristics, and the ventilation ability and improved ability for the flooring to have reduced contact with vapor may be provided by means of the flooring mat 200 and the orientation of the entangled filament structure provided therein. Further, the floor structure 20 may have improved deflection properties given the lack of transferred vapor and improved ventilation occurring by means of the entangled filament structure, the flooring mat aiding in avoiding breakage of the floor structure by reducing mold, mildew, and other buildup consistent from moisture intrusion.

In some embodiments, the surface layer 220 can be attached to the flooring mat 200 during machining and provided as a unitary piece. In some embodiments, the surface layer 220 and flooring mat 200 can be provided separately and ultimately laid or adhered to each other during installation.

The entangled filament structure, shown as 103 in FIG. 1, may be provided in a space between the textile pad 101 shown in FIG. 1 and a top surface of the subfloor 210. The subfloor 210 may be provided in an orientation whereby the flooring mat 200 can be laid atop it.

In some embodiments, from top to bottom, as shown in FIG. 2, the floor structure may include the surface layer 220, flooring mat 200, and subfloor 210. The vapor barrier of the flooring mat 200 may contact the surface layer, and the entangled filament structure may contact the subfloor 210.

In some embodiments, there may exist one or more vapor barriers 101, textile pads 102 and entangled filament structure 103 to form the flooring mat 100. The flooring mat 100 may be formed of alternating layers (e.g., a first layer having a vapor barrier 102, second layer having a textile pad 101, third layer having entangled filament structure 103), and repeating in order one or more times from top to bottom. In other embodiments, vapor barriers 102 may sandwich the textile pad 101 and entangled filament structure 103 at either end (thus having two vapor barriers to every one textile pad and entangled filament structure). Other configurations may be possible as desirable.

Further, although the preceding description has been described herein with reference to particular means, materials and embodiments, it is not intended to be limited to the particulars disclosed herein; rather, it extends to all functionally equivalent structures, methods and uses, such are within the scope of the appended claims.

What is claimed is:

1. A flooring mat, comprising:
   a first layer;
   a second layer comprising a textile pad; and
   a third layer comprising an entangled filament structure,
   wherein the entangled filament structure is formed by extrusion into a three-dimensional structure having a patterned configuration,
   wherein the entangled filament structure comprises thermally bonded material,
   wherein the patterned configuration includes individual pyramids, cones, cylinders, cubes or domes,
   wherein the individual pyramids, cones, cylinders, cubes or domes are separated by intersecting lanes, the lanes being areas where polymers of the entangled filament structure adhere to the second layer, the pattern of the individual pyramids, cones, cylinders, cubes or domes of filaments extending continuously across an entirety of the third layer, each of the individual pyramids, cones, cylinders, cubes or domes of filaments separated from adjacent ones of the individual pyramids, cones, cylinders, cubes or domes of filaments along both a first axis and a second axis perpendicular to the first axis.

2. The flooring mat according to claim 1, wherein the second layer is disposed between the first layer and the third layer.

3. The flooring mat according to claim 1, wherein the first layer is a vapor barrier.

4. The flooring mat according to claim 1, wherein the textile pad comprises a fibrous web layer where one surface of the fibrous web layer is coated with an adhesive, and wherein the fibrous web layer comprises interlocked reinforcement fibers distributed substantially randomly in a first plane.

5. The flooring mat according to claim 3, wherein the vapor barrier comprises a single polyethylene layer.

6. The flooring mat according to claim 3, wherein the vapor barrier is fixedly coupled to the textile pad.

7. The flooring mat according to claim 1, wherein the entangled filament structure comprises an entangled core having the patterned configuration.

8. The flooring mat according to claim 1, wherein the individual pyramids, cones, cylinders, cubes or domes of filaments are individual cubes of filaments.

9. The flooring mat according to claim 1, wherein air gaps are provided between the individual pyramids, cones, cylinders, cubes or domes of filaments of the entangled filament structure, so as to provide a spacing between at least some portions of the entangled filament structure and the textile pad.

10. The flooring mat according to claim 1, wherein the thermally bonded material is polyamide-6 or polypropylene.

11. The flooring mat according to claim 1, wherein the entangled filament structure has a thickness of about 0.03 inches to about 0.4 inches.

12. The flooring mat according to claim 1, wherein the flooring mat has a thickness of about 0.2 inches to about 1 inch.

13. A floor structure comprising:
    a sub floor;
    a flooring surface; and
    a flooring mat disposed between the sub floor and the flooring surface, the flooring mat comprising a first layer, a second layer comprising a textile pad, and a third layer comprising an entangled filament structure,
    wherein the second layer is disposed between the first layer and the third layer,
    wherein the entangled filament structure is formed by extrusion into a three-dimensional structure having a patterned configuration,
    wherein the entangled filament structure comprises thermally bonded material,
    wherein the patterned configuration includes individual pyramids, cones, cylinders, cubes or domes, and
    wherein the individual pyramids, cones, cylinders, cubes or domes are separated by intersecting lanes, the lanes being areas where polymers of the entangled filament structure adhere to the second layer, the pattern of the individual pyramids, cones, cylinders, cubes or domes of filaments extending continuously across an entirety of the third layer, each of the individual pyramids, cones, cylinders, cubes or domes of filaments separated from adjacent ones of the individual pyramids, cones, cylinders, cubes or domes of filaments along both a first axis and a second axis perpendicular to the first axis.

14. The floor structure according to claim 13, wherein the first layer is in contact with the flooring surface.

15. The floor structure according to claim 13, wherein the entangled filament structure is in contact with the sub floor.

16. The floor structure according to claim 13, wherein the flooring surface is a wood-based laminate.

17. The floor structure according to claim 13, wherein the entangled filament structure is configured in a waffle-like pattern.

18. The floor structure according to claim 13, wherein the entangled filament structure has a first surface is fixedly bonded to the textile pad at a plurality of contact points, and in contact with the subfloor at a second surface opposite the first surface.

19. The floor structure according to claim 13, wherein the floor structure includes gyperete.

20. The floor structure according to claim 13, wherein the thermally bonded material is polyamide-6 or polypropylene.

* * * * *